(12) United States Patent
Shearer

(10) Patent No.: US 7,893,936 B2
(45) Date of Patent: Feb. 22, 2011

(54) GENERATING EFFICIENT SPATIAL INDEXES FOR PREDICTABLY DYNAMIC OBJECTS

(75) Inventor: Robert Allen Shearer, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 491 days.

(21) Appl. No.: 11/622,613

(22) Filed: Jan. 12, 2007

(65) Prior Publication Data

US 2008/0170071 A1 Jul. 17, 2008

(51) Int. Cl.
*G06T 17/00* (2006.01)
*G06T 15/50* (2006.01)

(52) U.S. Cl. ...................................... 345/420; 345/426
(58) Field of Classification Search ........................ None
See application file for complete search history.

(56) References Cited

U.S. PATENT DOCUMENTS

| | | | | |
|---|---|---|---|---|
| 7,002,571 | B2 * | 2/2006 | Lake et al. .................. | 345/420 |
| 7,012,604 | B1 * | 3/2006 | Christie et al. .............. | 345/426 |
| 7,164,420 | B2 * | 1/2007 | Ard ............................. | 345/423 |
| 7,289,118 | B2 * | 10/2007 | Schmittler et al. .......... | 345/423 |
| 2003/0227455 | A1 * | 12/2003 | Lake et al. .................. | 345/421 |
| 2006/0066607 | A1 * | 3/2006 | Schmittler et al. .......... | 345/419 |
| 2009/0167763 | A1 | 7/2009 | Waechter et al. | |

OTHER PUBLICATIONS

Günther, J., Friedrich, H., Wald, I., Seidel, H.-P., and Slusallek, P. 2006. Ray tracing animated scenes using motion decomposition. In Proceedings of Eurographics.*
Eisemann M., Grosch T., Magnor M., Mueller S.: Automatic Creation of Object Hierarchies for Ray Tracing of Dynamic Scenes. Tech. Rep. 2006-6-1, TU Braunschweig, 2006.*
Woop, S., Marmitt, G., and Slusallek, P. 2006. B-KD trees for hardware accelerated ray tracing of dynamic scenes. In Proceedings of the 21st ACM Siggraph/Eurographics Symposium on Graphics Hardware (Vienna, Austria, Sep. 3-4, 2006). GH '06. ACM, New York, NY.*

(Continued)

*Primary Examiner*—Daniel F Hajnik
(74) *Attorney, Agent, or Firm*—Patterson & Sheridan, LLP

(57) ABSTRACT

Embodiments of the invention provide methods and apparatus for modifying a spatial index in response to movements of a predictably dynamic object within a three-dimensional scene. According to one embodiment of the invention, in contrast to generating a new spatial index in response to movement of a predictably dynamic object, a portion of an existing spatial index may be modified in response to the movement of a predictably dynamic object. According to one embodiment of the invention, modification may include changing information defining the position of splitting planes along a splitting axis to correspond to the new position of the object within the three-dimensional scene. In contrast to generating a new spatial index, by modifying only a portion of an existing spatial index the amount of time required to perform ray tracing image processing may be reduced.

19 Claims, 14 Drawing Sheets

OTHER PUBLICATIONS

Foley, T. And Sugerman, J. 2005. KD-tree acceleration structures for a GPU raytracer. In Proceedings of the ACM Siggraph/Eurographics Conference on Graphics Hardware (Los Angeles, California, Jul. 30-31, 2005). HWWS '05. ACM, New York, NY.*

Woop, S., Schmittler, J., and Slusallek, P. 2005. RPU: a programmable ray processing unit for realtime ray tracing. In ACM Siggraph 2005 Papers (Los Angeles, California, Jul. 31-Aug. 4, 2005). M. Gross, Ed. Siggraph '05. ACM, New York, NY.*

Lauterbach, C., Yoon, S.-E., Tuft, D., and Manocha, D. 2006. RT-DEFORM: Interactive ray tracing of dynamic scenes using BVHs. In Proceedings of the 2006 IEEE Symposium on Interactive Ray Tracing.*

Larsson, T. and Akenine-Möller, T. 2003. Strategies for bounding volume hierarchy updates for ray tracing of deformable models. Tech. rep. MDH-MRTC-92/2003-1-SE, Feb., MRTC.*

Stoll, G., Mark, W. R., Djeu, P., Wang, R., and Elhassan, I. 2006. Razor: An architecture for dynamic multiresolution ray tracing. Tech. rep. 06-21, Department of Computer Science, University of Texas at Austin.*

* cited by examiner

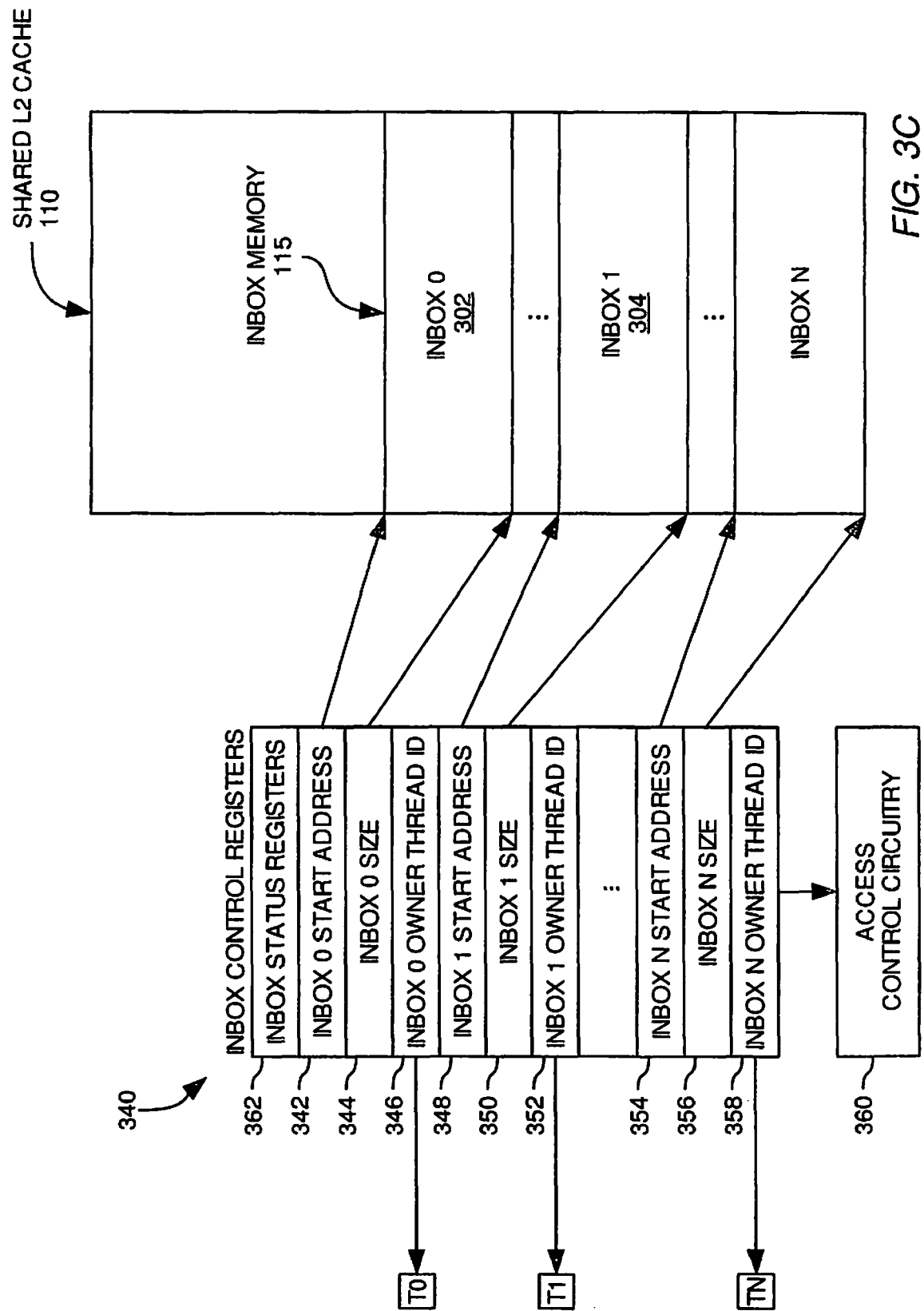

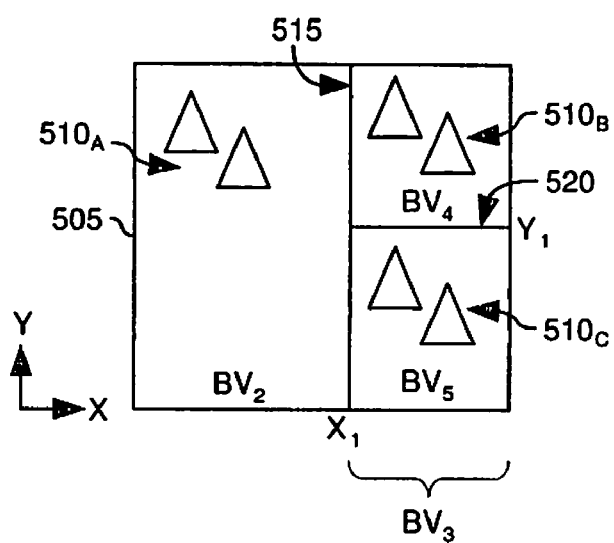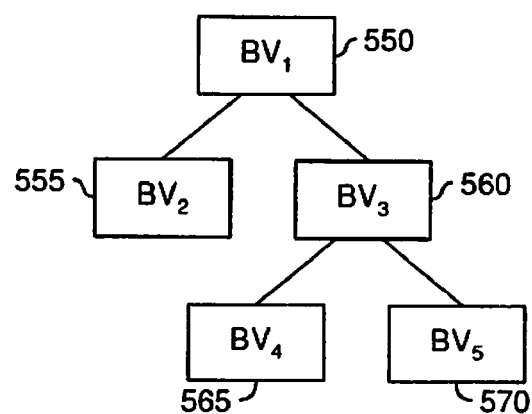
FIG. 5C

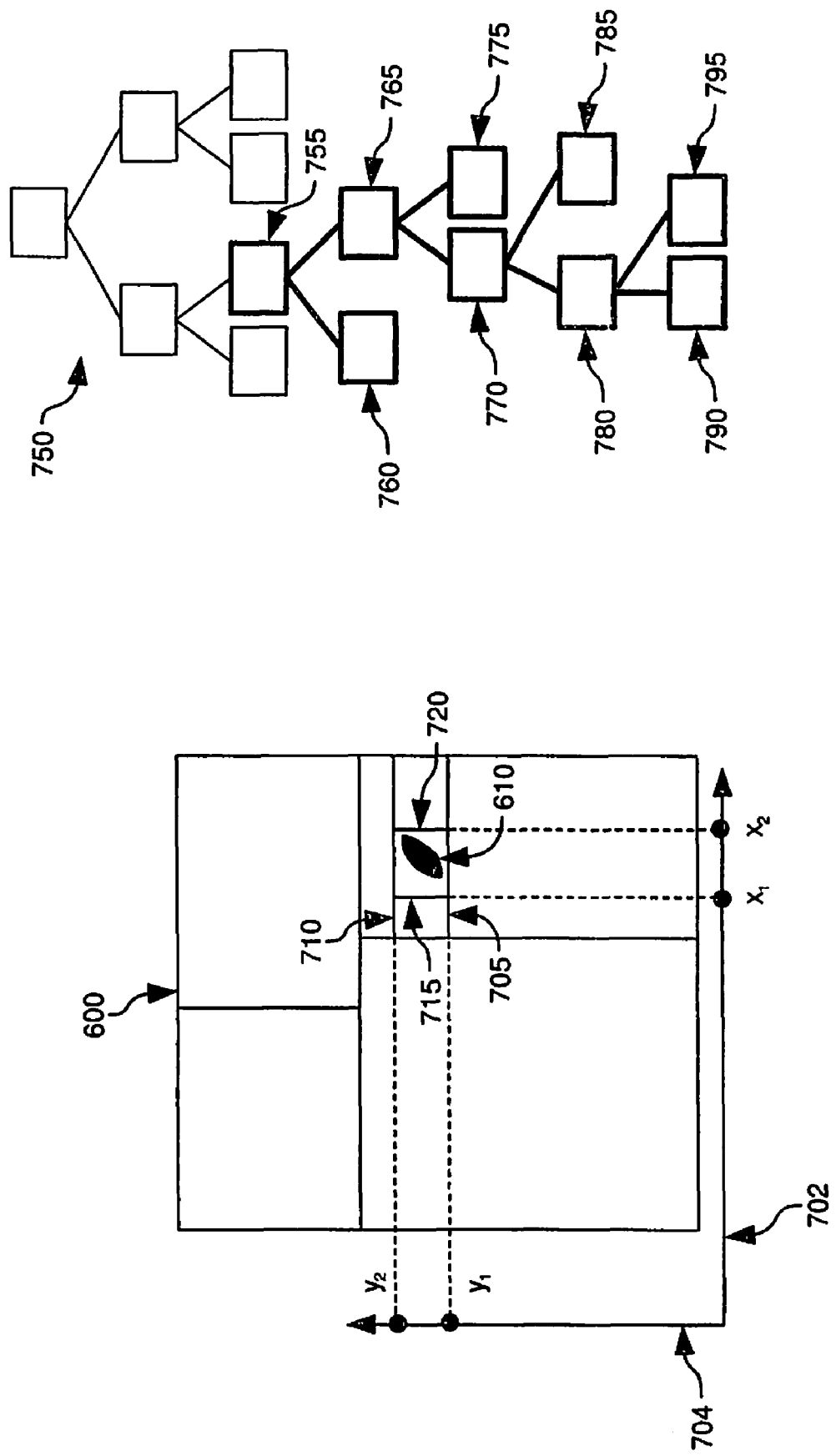
FIG. 7 - FRAME N

| NODE TYPE | SPLITTING PLANE AXIS | SPLITTING PLANE POSITION | POINTERS TO CHILD NODES | |
|---|---|---|---|---|
| INTERNAL | Y-AXIS | $Y_1$ | 760 | 765 |
| INTERNAL | Y-AXIS | $Y_2$ | 770 | 775 |
| INTERNAL | X-AXIS | $X_1$ | 780 | 785 |
| INTERNAL | X-AXIS | $X_2$ | 790 | 795 |

755 {  
765 {  
770 {  
780 {

*FIG. 8 - FRAME N*

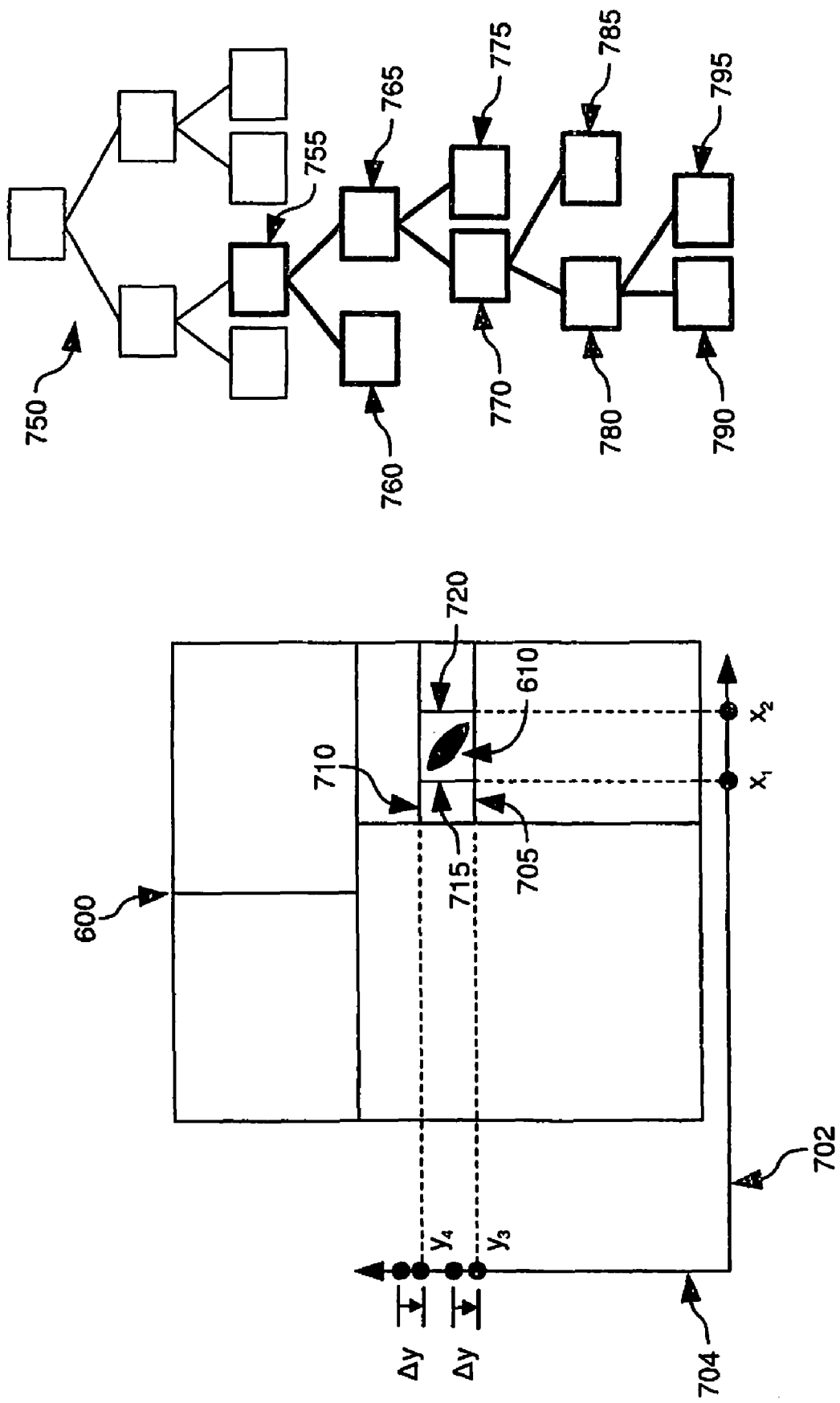
FIG. 10 - FRAME N+1

| NODE TYPE | SPLITTING PLANE AXIS | SPLITTING PLANE POSITION | POINTERS TO CHILD NODES | |
|---|---|---|---|---|
| INTERNAL | Y-AXIS | $Y_3$ | 760 | 765 |
| INTERNAL | Y-AXIS | $Y_4$ | 770 | 775 |
| INTERNAL | X-AXIS | $X_1$ | 780 | 785 |
| INTERNAL | X-AXIS | $X_2$ | 790 | 795 |

755
765
770
780

*FIG. 11 - FRAME N+1*

US 7,893,936 B2

GENERATING EFFICIENT SPATIAL INDEXES FOR PREDICTABLY DYNAMIC OBJECTS

BACKGROUND OF THE INVENTION

1. Field of the Invention

Embodiments of the invention generally relate to the field of image processing.

2. Description of the Related Art

The process of rendering two-dimensional images from three-dimensional scenes is commonly referred to as image processing. As the modern computer industry evolves image processing evolves as well. One particular goal in the evolution of image processing is to make two-dimensional simulations or renditions of three-dimensional scenes as realistic as possible. One limitation of rendering realistic images is that modern monitors display images through the use of pixels.

A pixel is the smallest area of space which can be illuminated on a monitor. Most modern computer monitors will use a combination of hundreds of thousands or millions of pixels to compose the entire display or rendered scene. The individual pixels are arranged in a grid pattern and collectively cover the entire viewing area of the monitor. Each individual pixel may be illuminated to render a final picture for viewing.

One technique for rendering a real world three-dimensional scene onto a two-dimensional monitor using pixels is called rasterization. Rasterization is the process of taking a two-dimensional image represented in vector format (mathematical representations of geometric objects within a scene) and converting the image into individual pixels for display on the monitor. Rasterization is effective at rendering graphics quickly and using relatively low amounts of computational power; however, rasterization suffers from some drawbacks. For example, rasterization often suffers from a lack of realism because it is not based on the physical properties of light, rather rasterization is based on the shape of three-dimensional geometric objects in a scene projected onto a two-dimensional plane. Furthermore, the computational power required to render a scene with rasterization scales directly with an increase in the complexity of the scene to be rendered. As image processing becomes more realistic, rendered scenes also become more complex. Therefore, rasterization suffers as image processing evolves, because rasterization scales directly with complexity.

Another technique for rendering a real world three-dimensional scene onto a two-dimensional monitor using pixels is called ray tracing. The ray tracing technique traces the propagation of imaginary rays, rays which behave similar to rays of light, into a three-dimensional scene which is to be rendered onto a computer screen. The rays originate from the eye(s) of a viewer sitting behind the computer screen and traverse through pixels, which make up the computer screen, towards the three-dimensional scene. Each traced ray proceeds into the scene and may intersect with objects within the scene. If a ray intersects an object within the scene, properties of the object and several other contributing factors are used to calculate the amount of color and light, or lack thereof, the ray is exposed to. These calculations are then used to determine the final color of the pixel through which the traced ray passed.

The process of tracing rays is carried out many times for a single scene. For example, a single ray may be traced for each pixel in the display. Once a sufficient number of rays have been traced to determine the color of all of the pixels which make up the two-dimensional display of the computer screen, the two-dimensional synthesis of the three-dimensional scene can be displayed on the computer screen to the viewer.

Ray tracing typically renders real world three-dimensional scenes with more realism than rasterization. This is partially due to the fact that ray tracing simulates how light travels and behaves in a real world environment, rather than simply projecting a three-dimensional shape onto a two-dimensional plane as is done with rasterization. Therefore, graphics rendered using ray tracing more accurately depict on a monitor what our eyes are accustomed to seeing in the real world.

Furthermore, ray tracing also handles increases in scene complexity better than rasterization as scenes become more complex. Ray tracing scales logarithmically with scene complexity. This is due to the fact that the same number of rays may be cast into a scene, even if the scene becomes more complex. Therefore, ray tracing does not suffer in terms of computational power requirements as scenes become more complex as rasterization does.

One major drawback of ray tracing is the large number of calculations, and thus processing power, required to render scenes. This leads to problems when fast rendering is needed. For example, when an image processing system is to render graphics for animation purposes such as in a game console. Due to the increased computational requirements for ray tracing it is difficult to render animation quickly enough to seem realistic (realistic animation is approximately twenty to twenty-four frames per second).

Therefore, there exists a need for more efficient techniques and devices to perform ray tracing.

SUMMARY OF THE INVENTION

Embodiments of the present invention generally provide methods and apparatus for performing ray tracing.

According to one embodiment of the invention, a method of representing objects located within a three-dimensional scene in spatial indexes is provided. The method generally comprising: providing an object in a first position within the three-dimensional scene; generating a spatial index having nodes defining bounded volumes which partition the three-dimensional scene, wherein a first portion of the spatial index defines bounding volumes containing the object; and in response to movement of the object from the first position to a second position, modifying the first portion of the spatial index based on the second position of the object.

According to another embodiment of the invention, a computer readable medium is provided. The computer readable medium containing a program which, when executed, performs operations generally comprising: providing an object in a first position within the three-dimensional scene; generating a spatial index having nodes defining bounded volumes which partition the three-dimensional scene, wherein a first portion of the spatial index defines bounding volumes containing the object; and in response to movement of the object from the first position to a second position, modifying the first portion of the spatial index based on the second position of the object.

According to another embodiment of the invention, an image processing system is provided. The image processing system generally comprising: spatial index logic configured to generate a spatial index having nodes defining bounded volumes which partition a three-dimensional scene, wherein a first portion of the spatial index defines bounding volumes containing an object within the three-dimensional scene; and a processing element configured to move the object from a first position to a second position; and wherein the spatial index logic is further configured to modify the first portion of the spatial index based on the second position of the object.

BRIEF DESCRIPTION OF THE DRAWINGS

FIGS. 3A-3C are block diagrams illustrating aspects of memory inboxes according to one embodiments of the invention.

FIGS. 5A-5C illustrate a two-dimensional space to be rendered by an image processing system and a corresponding spatial index created by an image processing system, according to one embodiment of the invention.

FIGS. 7 and 10 illustrate exemplary bounding volumes and spatial indexes, according to one embodiment of the invention.

FIGS. 8 and 11 illustrate information stored within a spatial index, according to one embodiment of the invention.

DETAILED DESCRIPTION OF THE PREFERRED EMBODIMENTS

Figure 1:
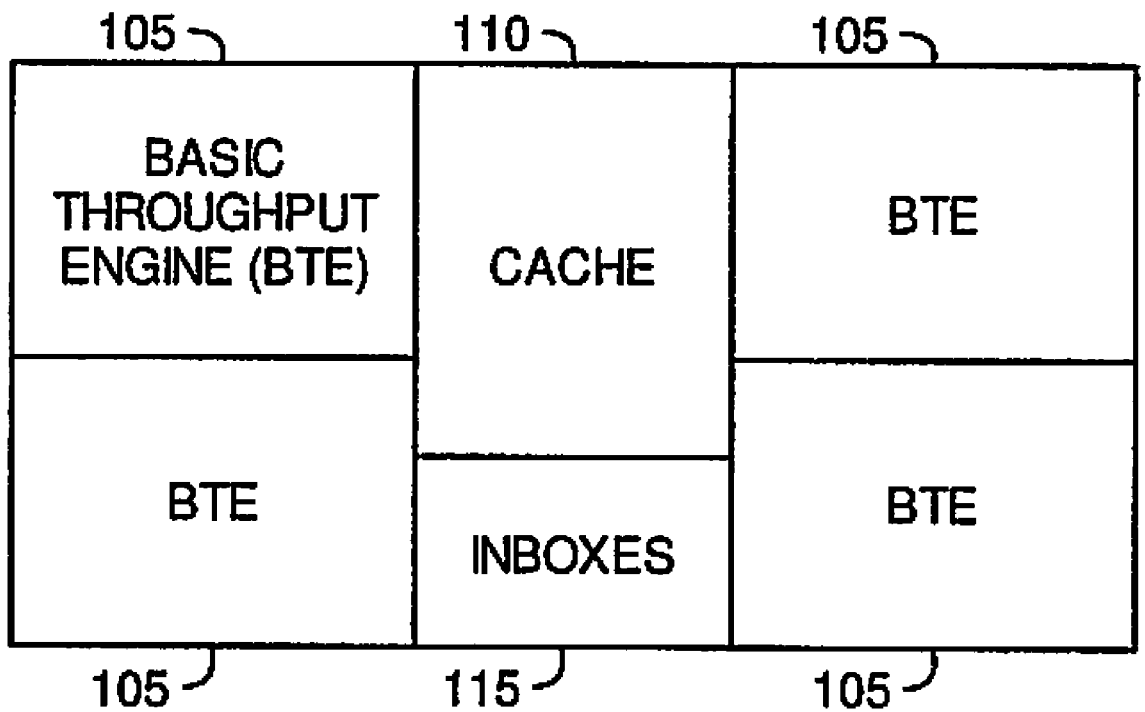
FIG. 1 is a block diagram depicting an exemplary computer processor, according to one embodiment of the invention.

Embodiments of the invention provide methods and apparatus for modifying a spatial index in response to movements of a predictably dynamic object within a three-dimensional scene. According to one embodiment of the invention, in contrast to generating a new spatial index in response to movement of a predictably dynamic object, a portion of an existing spatial index may be modified in response to the movement of a predictably dynamic object. According to one embodiment of the invention, modification may include changing information defining the position of splitting planes along a splitting axis to correspond to the new position of the object within the three-dimensional scene. In contrast to generating a new spatial index, by modifying only a portion of an existing spatial index the amount of time required to perform ray tracing image processing may be reduced.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system such as, for example, the image processing system described below. The program(s) of the program product defines functions of the embodiments (including the methods described herein) and can be contained on a variety of computer-readable media. Illustrative computer-readable media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet and other networks. Such computer-readable media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

An Exemplary Multiple Core Processing Element

FIG. 1 illustrates a multiple core processing element 100, according to one embodiment of the invention. The multiple core processing element 100 includes a plurality of basic throughput engines 105 (BTEs). A BTE 105 may contain a plurality of processing threads and a core cache (e.g., an L1 cache). The processing threads located within each BTE may have access to a shared multiple core processing element memory cache 110 (e.g., a shared L2 cache).

The BTEs 105 may also have access to a plurality of inboxes 115. The inboxes 115, described further below with regards to FIG. 3, may be memory mapped address space. The inboxes 115 may be mapped to the processing threads located within each of the BTEs 105. Each thread located within the BTEs may have a memory mapped inbox and access to all of the other memory mapped inboxes 115. The inboxes 115 make up a low-latency and high-bandwidth communications network used by the BTEs 105.

The BTEs may use the inboxes 115 as a network to communicate with each other and redistribute data processing work amongst the BTEs. For some embodiments, separate outboxes may be used in the communications network, for example, to receive the results of processing by BTEs 105. For other embodiments, inboxes 115 may also serve as outboxes, for example, with one BTE 105 writing the results of a processing function directly to the inbox of another BTE 105 that will use the results.

The aggregate performance of an image processing system may be tied to how well the BTEs can partition and redistribute work. The network of inboxes 115 may be used to collect and distribute work to other BTEs without corrupting the shared multiple core processing element cache 110 with BTE communication data packets that have no frame to frame coherency. An image processing system which can render many millions of triangles per frame may include many BTEs 105 connected in this manner.

In one embodiment of the invention, the threads of one BTE 105 may be assigned to a workload manager. An image processing system may use various software and hardware components to render a two-dimensional image from a three-dimensional scene. According to one embodiment of the invention, an image processing system may use a workload manager to traverse a spatial index with a ray issued by the image processing system. A spatial index, as described further below with regards to FIG. 4, may be implemented as a tree type data structure used to partition a relatively large three-dimensional scene into smaller bounding volumes. An image processing system using a ray tracing methodology for image processing may use a spatial index to quickly determine ray-bounding volume intersections. In one embodiment of the invention, the workload manager may perform ray-bounding volume intersection tests by using the spatial index.

In one embodiment of the invention, other threads of the multiple core processing element BTEs 105 on the multiple core processing element 100 may be vector throughput engines. After a workload manager determines a ray-bounding volume intersection, the workload manager may issue (send), via the inboxes 115, the ray to one of a plurality of vector throughput engines. According to one embodiment of the invention, the vector throughput engines may then determine if the ray intersects a primitive contained within the bounding volume. The vector throughput engines may also perform operations relating to determining the color of the pixel through which the ray passed.

Figure 2:
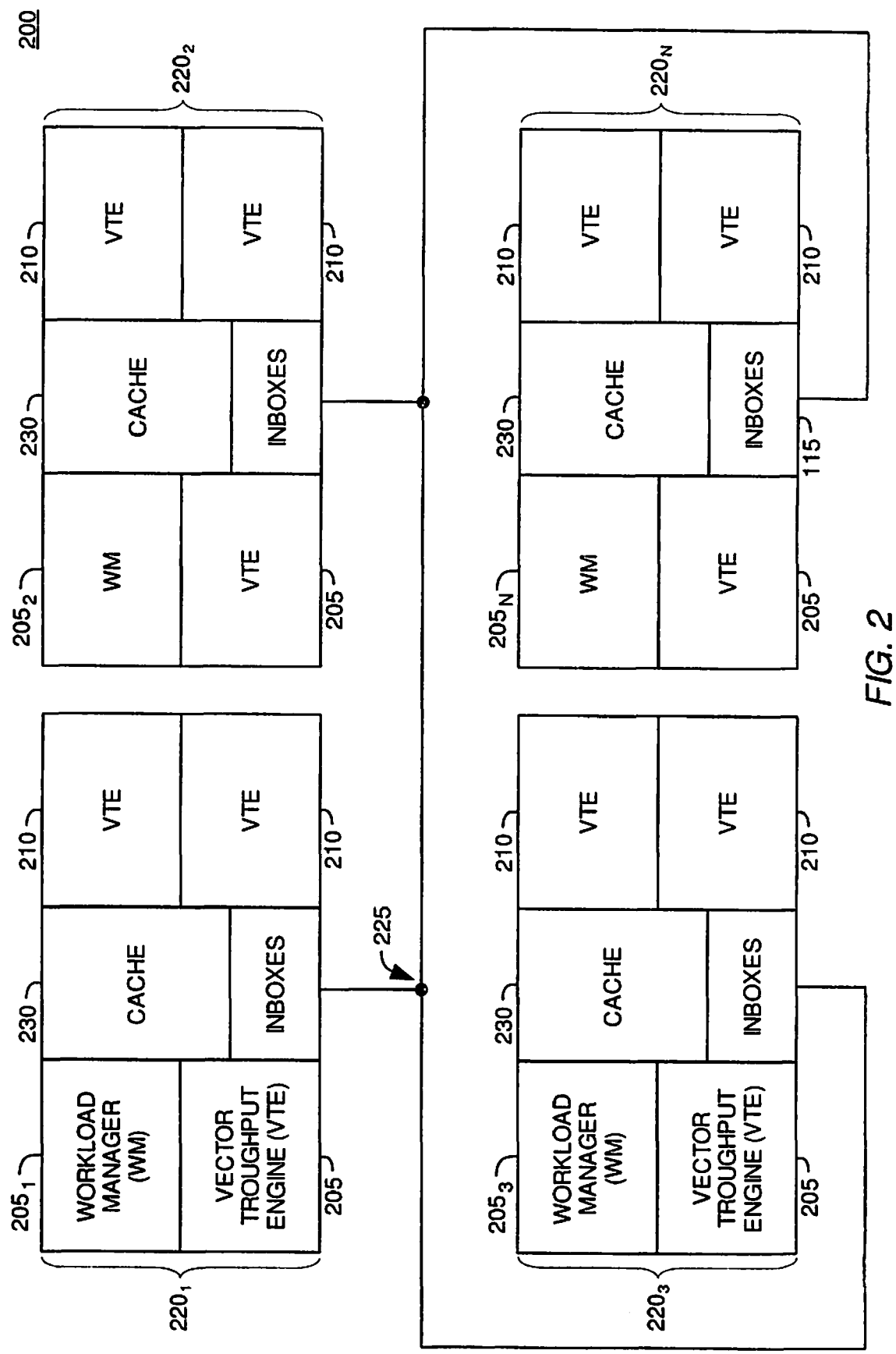
FIG. 2 illustrates a multiple-core processing element network, according to one embodiment of the invention.

FIG. 2 illustrates a network of multiple core processing elements 200, according to one embodiment of the invention. FIG. 2 also illustrates one embodiment of the invention where the threads of one of the BTEs of the multiple core processing element 100 is a workload manager 205. Each multiple core processing element $220_{1-N}$ in the network of multiple core processing elements 200 may contain one workload manager $205_{1-N}$, according to one embodiment of the invention. Each processor 220 in the network of multiple core processing elements 200 may also contain a plurality of vector throughput engines 210, according to one embodiment of the invention.

The workload managers $220_{1-N}$ may use a high speed bus 225 to communicate with other workload managers $220_{1-N}$ and/or vector throughput engines 210 of other multiple core processing elements 220, according to one embodiment of the invention. Each of the vector throughput engines 210 may use the high speed bus 225 to communicate with other vector throughput engines 210 or the workload managers 205. The workload manager processors 205 may use the high speed bus 225 to collect and distribute image processing related tasks to other workload manager processors 205, and/or distribute tasks to other vector throughput engines 210. The use of a high speed bus 225 may allow the workload managers $205_{1-N}$ to communicate without affecting the caches 230 with data packets related to workload manager 205 communications.

Low-Latency High-Bandwidth Communications Network

As described above, the aggregate performance of an image processing system may be tied to how well the BTEs can partition and redistribute work. According to one embodiment of the invention, memory space within a cache, referred to as a memory inbox, may be used to distribute work to a single processor thread. In an image processing system using a plurality of processors each having a plurality of threads, the collection of inboxes together may be referred to as a low-latency high-bandwidth communications network.

In multithreading processor such as a BTE 105, a memory inbox may be assigned to a given thread (referred to herein as the owner thread). In one embodiment of the invention, the memory space for the inbox may be allocated from the shared memory cache 110 exclusively to the owner thread. By exclusively assigning the memory space in a cache to the owner thread, the owner thread may maintain enough memory space to cache its own instructions and data without other having other competing threads displace the owner thread's instructions and data. Thus, the memory inbox may improve execution of the owner thread by maintaining the owner thread's data and instructions in the assigned inbox portion of the cache and reducing the possibility of stalling the owner thread while data and instructions for the owner thread are retrieved from higher levels of memory. Furthermore, by assigning the memory space in a cache to the owner thread, data or instructions intended for the targeted thread may be stored only in an inbox allocated to the thread. Thus, data or instructions intended for the targeted thread are not stored throughout the shared memory cache 110, rather only in the inbox allocated to the targeted thread.

Furthermore, the inbox memory may be used by other threads to efficiently communicate with the owner thread. For example, where another thread has data and/or instructions which are to be provided to the owner thread for an inbox, the other thread may send the data and/or instructions to the inbox where the data and/or instructions may be retrieved by the owner thread. Similarly, in some cases, the owner thread may use the inbox as an outbox to communicate information with other threads. For example, to communicate the information with another thread, the owner thread may place the information in the inbox and send a notification to the other thread indicating the location of the data and/or instructions, thereby allowing the other thread to retrieve the information. Optionally, the owner thread may provide the information directly to the inbox of the other thread. Thus, the inbox memory may be used to simplify communication between a sending and a receiving thread while preventing displacement of data and/or instructions being used by other threads.

Figure 3A:
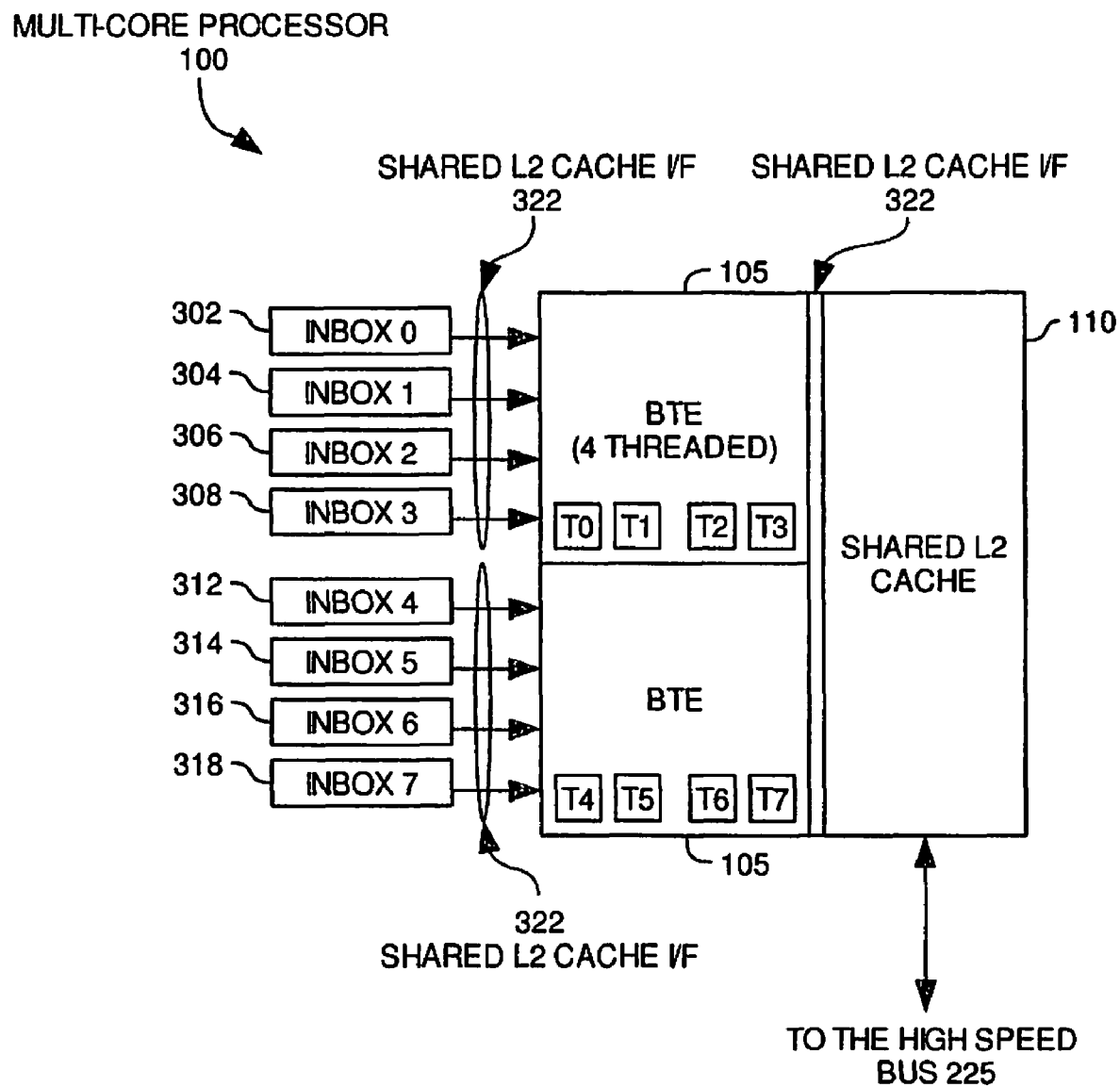

FIG. 3A is a block diagram of memory inboxes 302 . . . 318 in a multi-core processor element 100 according to one embodiment of the invention. The depiction of the memory inboxes 302 . . . 318 is intended to be a conceptual view and therefore is not limited to any particular physical configuration. As depicted, threads (e.g., threads T0-T7) executing in each core (e.g., the BTEs 105) may have access to the shared L2 cache 110 via a shared L2 cache interface 322. Furthermore, the L2 cache interface 322 may also be used by the threads T0 . . . T7 to access the corresponding memory inboxes 302 . . . 318. As described above, in some cases, each inbox 302 . . . 318 may be assigned to a corresponding thread T0-T7. Thus, Inbox 0 302 may be assigned to thread T0 and so on. As described below, by assigning a given inbox to a given thread, access to the assigned inbox may be unrestricted with respect to the owner thread while access by other threads may be restricted. Exemplary restrictions are described below in greater detail.

Figure 3B:
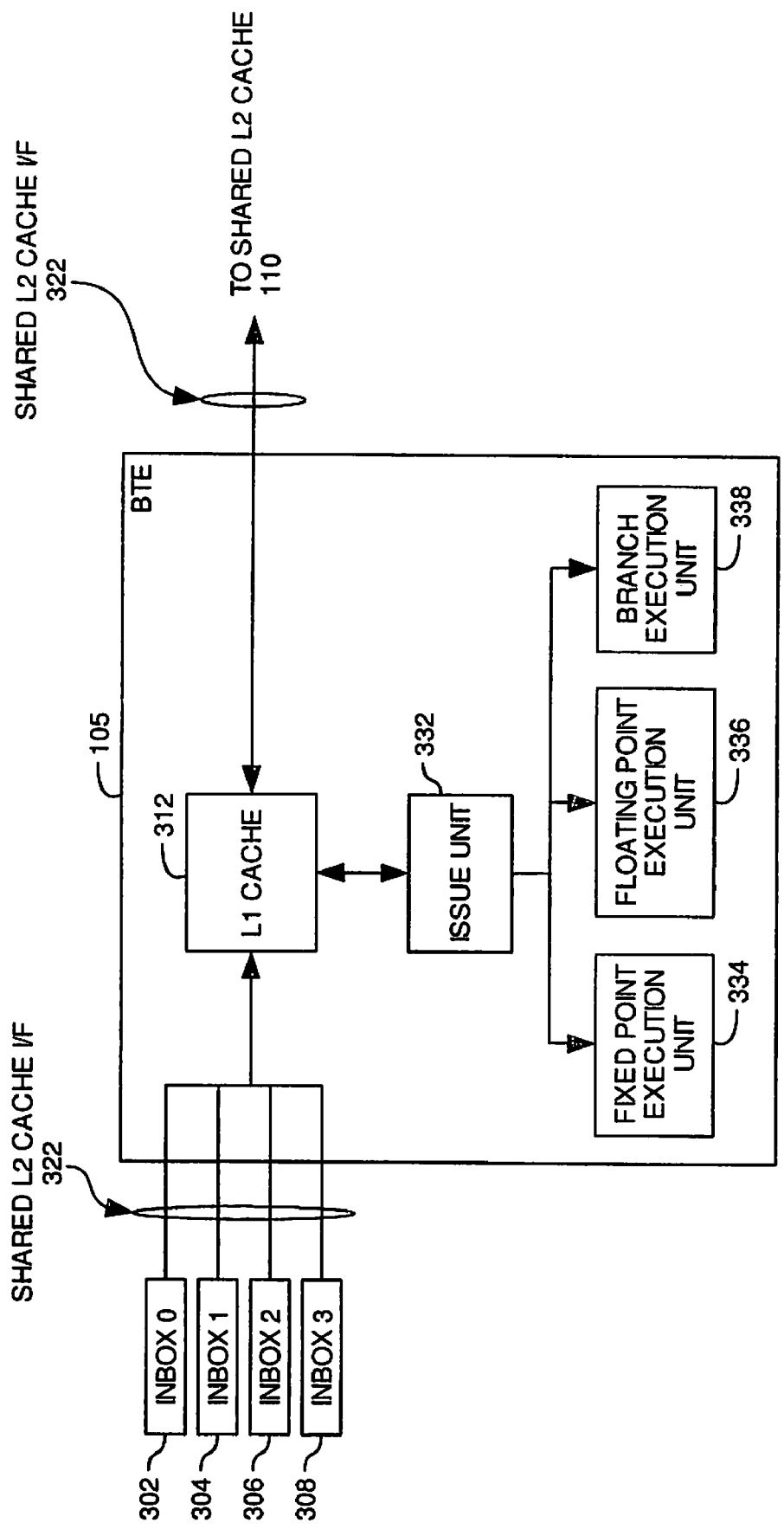

FIG. 3B is a block diagram depicting the path of data from memory inboxes (e.g., inboxes 302 . . . 308) and the shared L2 cache 110 transmitted to and from a processing core (e.g., BTE 105). As described above, both the memory inboxes 302 . . . 308 and the shared L2 cache 110 may be accessed via the shared L2 cache interface 322. Where a thread being executed in the BTE 105 retrieves data from an inbox 302 . . . 308 or from the shared L2 cache 110, the retrieved data may be placed in the L1 cache 312 for the BTE 105. Instructions for the thread may be issued from an issue unit 332. In some cases, the BTE 105 may be configured to execute multiple threads concurrently. Thus, the issue unit 332 may be configured to issue instructions for multiple threads. In some cases, the BTE 105 may provide multiple execution units 334 . . . 338 which may be used to concurrently execute threads in the BTE 105. The execution units 334 . . . 338 may include a fixed point execution unit 334, a floating point execution unit 336 and a branch execution unit 338.

In some cases, a thread may update or produce data which is to be accessed later (e.g., by the same thread or by another thread). Where the updated data is to be accessed later, the thread may place the updated data in an L1 cache 312. Furthermore, where desired, the updated data may also be placed in the L2 cache 110 or in an inbox 302 . . . 308 for the updating thread via the shared L2 cache interface 322. In some cases, as described above, direct access to a given inbox (e.g., inbox 0 302) via the shared L2 cache interface 322 may be limited to the thread (e.g., thread T0) which owns the given inbox.

In one embodiment of the invention, memory space within a memory inbox may be mapped to a global memory address (e.g., all levels of memory including the L1 cache 312, L2 cache 110, and main memory as well as all threads may use the same global memory address to access a given memory inbox). Thus, in one embodiment of the invention, to access the inbox memory space, the owner thread may merely read or write the desired information to a global memory address corresponding to the inbox memory space. A thread which does not own the memory inbox and which attempts to directly access the inbox via the global memory address, may have access to the inbox denied. Other forms of access may instead be provided to other non-owning threads, e.g., via packetized messages sent to the inbox.

Also, in one embodiment of the invention, information being stored in a memory inbox may not be cacheable. For example, while information in the L1 cache 312, L2 cache 110, and other memory level may be automatically cached by the multi core processing element 100 such that information requested from a given memory address may be automatically fetched from main memory and maintained in one of the cache levels 312, 110 while being accessed. In contrast, the globally addressable memory in a given inbox may only be located in the inbox and may not be moved between different levels of the memory hierarchy (e.g., the main memory, the shared L2 cache memory 110 or the L1 cache memory) without being copied to a new address space outside of the inbox. Thus, accesses to an inbox by an owner thread may be performed quickly and directly to the inbox memory without waiting for information to be fetched from another level of the memory hierarchy and/or translated during fetching. The non-cacheability of inbox memory may also apply with respect to packetized access of the inbox described below. Furthermore, in an alternate embodiment of the invention, information stored in the inbox may be cached in other levels of the memory hierarchy.

Assignment of Memory Inboxes

In one embodiment of the invention, memory inboxes may be provided from the shared memory cache 110 (e.g., a portion of the L2 cache 110 may be reserved for the inbox memory 115). FIG. 3C is a block diagram depicting inbox memory 115 partitioned from the shared L2 cache 110 according to one embodiment of the invention.

As depicted, the size and location of each inbox 302, 304, etc. may be controlled by inbox control registers 340. The status of each inbox 302, 304, etc. (e.g., enabled or disabled) may be indicated and/or modified via inbox status registers 362. In one embodiment, access to the inbox control registers 340 may be unrestricted. Optionally, in some cases, access to the inbox control registers may be limited, for example, to a subset of approved threads (e.g., the owner thread, a parent of the owner thread, a specially designated control thread, and/or an operating system kernel thread). In one embodiment, the inbox control registers 340 may include a start address register 342, 348 . . . 354, a size register 344, 350 . . . 356, and an owner thread identification register 346, 352 . . . 358.

In one embodiment, the start address registers 342, 348 . . . 354 may indicate a start address for each inbox 302, 304, etc. The size registers 344, 350 . . . 358 may indicate the size of a corresponding inbox 302, 304, etc. The memory space for an inbox may thus occupy each address beginning from the corresponding start address and ranging through the indicated size of the inbox. The size may be indicated in any manner, for example, as an absolute size in bytes or as an integer multiple of a fixed size (e.g., the size in the size registers 344, 350 . . . 358 may indicate the size in kilobytes).

In one embodiment, the owner thread identification register 346, 352 . . . 358 may identify which thread (e.g., thread T0, T1 . . . TN) owns a given inbox 302, 304, etc. While depicted with respect to threads and corresponding inboxes 1, 2 . . . N, embodiment of the invention may be used with any type of thread and/or inbox identifier (e.g., a number, an address, etc.). In one embodiment of the invention, the inbox identifier register may be used to restrict direct access to memory addresses within the corresponding inbox to the owner thread. In some cases, direct access may also be allowed by a limited selection of other threads, such as, for example, a parent thread of the owner thread, a specified control thread, and/or an operating system kernel thread. In one embodiment, access control circuitry 360 may be used to provide the restricted access.

By assigning portions of the shared memory cache 110 to the inboxes a low-latency high-bandwidth communications network may be formed. The remaining portion of the shared memory cache 110 may remain unassigned and, thus, available to store information which does not relate to communications between processing threads. The remaining portion of the shared memory cache 110 may be used to store geometry and data structures which are used by the image processing system to perform ray tracing (described further below with respect to FIG. 5).

A benefit of using only the inboxes for communications between processing threads and using the remaining portion of the shared memory cache 110 to store geometry and data structures is that no matter how much communications related information is passed through the inboxes, it will not consume the entire memory cache. Thus, as will be described further below, communications related information will not displace the geometry and data structures stored within the remaining portion of the shared memory cache 100. Therefore, data which is likely to be reused when tracing subsequent rays or rendering subsequent frames (object geometry and data structures) may remain in the cache, while data which is unlikely to be reused when tracing subsequent rays or rendering subsequent frames (data processing work) will not remain in the cache.

An Exemplary Three-Dimensional Scene

Figure 4:
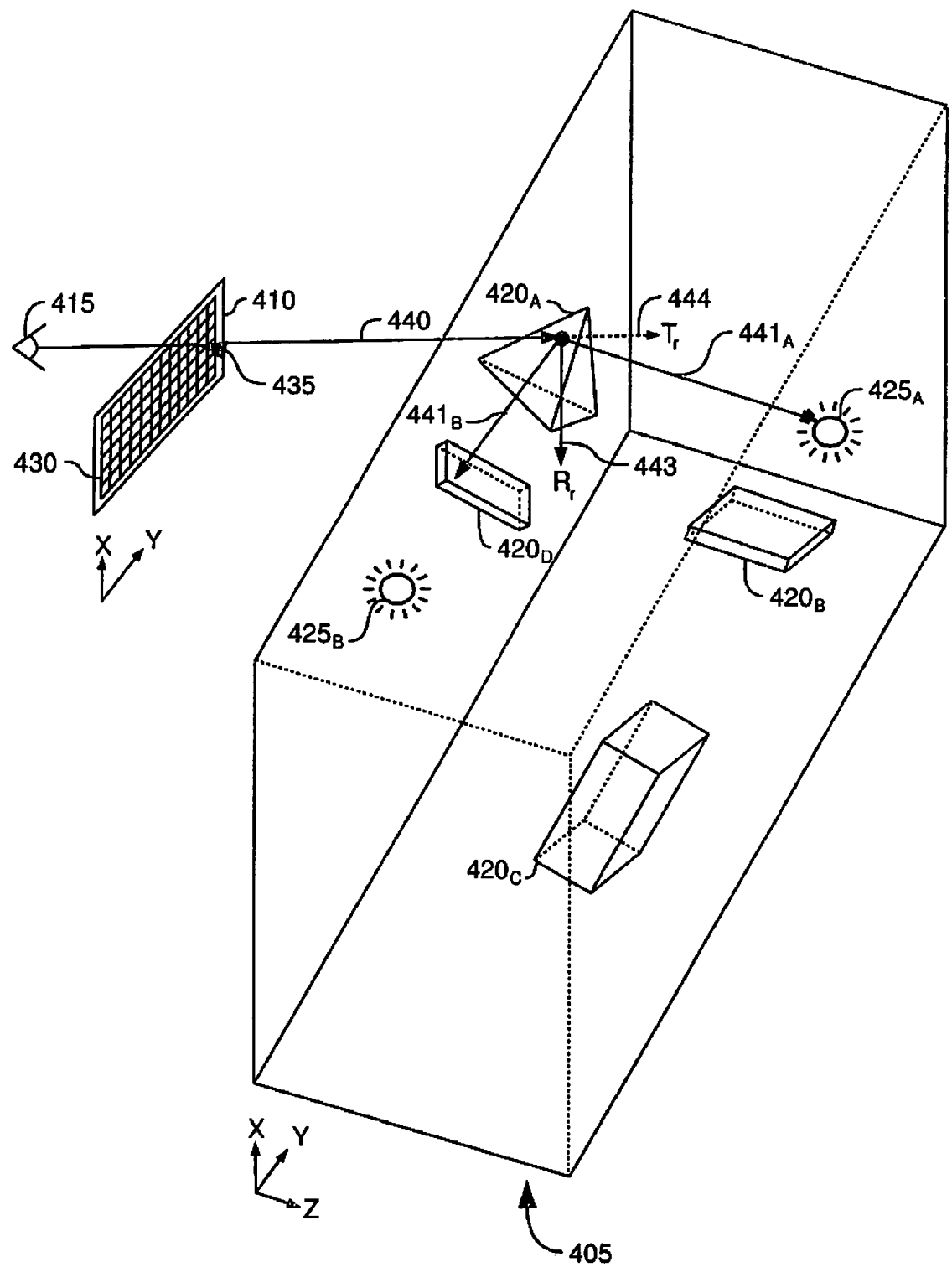
FIG. 4 is an exemplary three-dimensional scene to be rendered by an image processing system, according to one embodiment of the invention.

FIG. 4 is an exemplary three-dimensional scene 405 to be rendered by an image processing system. Within the three-dimensional scene 405 may be objects 420. The objects 420 in FIG. 4 are of different geometric shapes. Although only four objects 420 are illustrated in FIG. 4, the number of objects in a typical three-dimensional scene may be more or less. Commonly, three-dimensional scenes will have many more objects than illustrated in FIG. 4.

As can be seen in FIG. 4 the objects are of varying geometric shape and size. For example, one object in FIG. 4 is a pyramid $420_A$. Other objects in FIG. 4 are boxes $420_{B-D}$. In many modern image processing systems objects are often broken up into smaller geometric shapes (e.g., squares, circles, triangles, etc.). The larger objects are then represented by a number of the smaller simple geometric shapes. These smaller geometric shapes are often referred to as primitives.

Also illustrated in the scene 405 are light sources $425_{A-B}$. The light sources may illuminate the objects 420 located within the scene 405. Furthermore, depending on the location of the light sources 425 and the objects 420 within the scene 405, the light sources may cause shadows to be cast onto objects within the scene 405.

The three-dimensional scene 405 may be rendered into a two-dimensional picture by an image processing system. The image processing system may also cause the two-dimensional picture to be displayed on a monitor 410. The monitor 410 may use many pixels 430 of different colors to render the final two-dimensional picture.

One method used by image processing systems to rendering a three-dimensional scene 420 into a two-dimensional picture is called ray tracing. Ray tracing is accomplished by the image processing system "issuing" or "shooting" rays from the perspective of a viewer 415 into the three-dimensional scene 420. The rays have properties and behavior similar to light rays.

One ray 440, that originates at the position of the viewer 415 and traverses through the three-dimensional scene 405, can be seen in FIG. 4. As the ray 440 traverses from the viewer 415 to the three-dimensional scene 405, the ray 440 passes through a plane where the final two-dimensional picture will be rendered by the image processing system. In FIG. 4 this plane is represented by the monitor 410. The point the ray 440 passes through the plane, or monitor 410, is represented by a pixel 435.

As briefly discussed earlier, most image processing systems use a grid 430 of thousands (if not millions) of pixels to render the final scene on the monitor 410. Each individual pixel may display a different color to render the final composite two-dimensional picture on the monitor 410. An image processing system using a ray tracing image processing methodology to render a two-dimensional picture from a three-dimensional scene will calculate the colors that the issued ray or rays encounters in the three-dimensional scene. The image processing scene will then assign the colors encountered by the ray to the pixel through which the ray passed on its way from the viewer to the three-dimensional scene.

The number of rays issued per pixel may vary. Some pixels may have many rays issued for a particular scene to be rendered. In which case the final color of the pixel is determined by the each color contribution from all of the rays that were issued for the pixel. Other pixels may only have a single ray issued to determine the resulting color of the pixel in the two-dimensional picture. Some pixels may not have any rays issued by the image processing system, in which case their color may be determined, approximated or assigned by algorithms within the image processing system.

To determine the final color of the pixel 435 in the two-dimensional picture, the image processing system must determine if the ray 440 intersects an object within the scene. If the ray does not intersect an object within the scene it may be assigned a default background color (e.g., blue or black, representing the day or night sky). Conversely, as the ray 440 traverses through the three-dimensional scene the ray 440 may strike objects. As the rays strike objects within the scene the color of the object may be assigned the pixel through which the ray passes. However, the color of the object must be determined before it is assigned to the pixel.

Many factors may contribute to the color of the object struck by the original ray 440. For example, light sources within the three-dimensional scene may illuminate the object. Furthermore, physical properties of the object may contribute to the color of the object. For example, if the object is reflective or transparent, other non-light source objects may then contribute to the color of the object.

In order to determine the effects from other objects within the three-dimensional scene, secondary rays may be issued from the point where the original ray 440 intersected the object. For example, one type of secondary ray may be a shadow ray. A shadow ray may be used to determine the contribution of light to the point where the original ray 440 intersected the object. Another type of secondary ray may be a transmitted ray. A transmitted ray may be used to determine what color or light may be transmitted through the body of the object. Furthermore, a third type of secondary ray may be a reflected ray. A reflected ray may be used to determine what color or light is reflected onto the object.

As noted above, one type of secondary ray may be a shadow ray. Each shadow ray may be traced from the point of intersection of the original ray and the object, to a light source within the three-dimensional scene 405. If the ray reaches the light source without encountering another object before the ray reaches the light source, then the light source will illuminate the object struck by the original ray at the point where the original ray struck the object.

For example, shadow ray $441_A$ may be issued from the point where original ray 440 intersected the object $420_A$, and may traverse in a direction towards the light source $425_A$. The shadow ray $441_A$ reaches the light source $425_A$ without encountering any other objects 420 within the scene 405. Therefore, the light source $425_A$ will illuminate the object $420_A$ at the point where the original ray 440 intersected the object $420_A$.

Other shadow rays may have their path between the point where the original ray struck the object and the light source blocked by another object within the three-dimensional scene. If the object obstructing the path between the point on the object the original ray struck and the light source is opaque, then the light source will not illuminate the object at the point where the original ray struck the object. Thus, the light source may not contribute to the color of the original ray and consequently neither to the color of the pixel to be rendered in the two-dimensional picture. However, if the object is translucent or transparent, then the light source may illuminate the object at the point where the original ray struck the object.

For example, shadow ray $441_B$ may be issued from the point where the original ray 440 intersected with the object $420_A$, and may traverse in a direction towards the light source $425_B$. In this example, the path of the shadow ray $441_B$ is blocked by an object $420_D$. If the object $420_D$ is opaque, then the light source $425_B$ will not illuminate the object $420_A$ at the point where the original ray 440 intersected the object $420_A$. However, if the object $420_D$ which the shadow ray is translucent or transparent the light source $425_B$ may illuminate the object $420_A$ at the point where the original ray 440 intersected the object $420_A$.

Another type of secondary ray is a transmitted ray. A transmitted ray may be issued by the image processing system if the object with which the original ray intersected has transparent or translucent properties (e.g., glass). A transmitted ray traverses through the object at an angle relative to the angle at which the original ray struck the object. For example, transmitted ray 444 is seen traversing through the object $420_A$ which the original ray 440 intersected.

Another type of secondary ray is a reflected ray. If the object with which the original ray intersected has reflective properties (e.g. a metal finish), then a reflected ray will be issued by the image processing system to determine what color or light may be reflected by the object. Reflected rays traverse away from the object at an angle relative to the angle at which the original ray intersected the object. For example, reflected ray 443 may be issued by the image processing system to determine what color or light may be reflected by the object $420_A$ which the original ray 440 intersected.

The total contribution of color and light of all secondary rays (e.g., shadow rays, transmitted rays, reflected rays, etc.) will result in the final color of the pixel through which the original ray passed.

An Exemplary kd-Tree

One problem encountered when performing ray tracing is determining quickly and efficiently if an issued ray intersects any objects within the scene to be rendered. One methodology known by those of ordinary skill in the art to make the ray intersection determination more efficient is to use a spatial index. A spatial index divides a three-dimensional scene or world into smaller volumes (smaller relative to the entire three-dimensional scene) which may or may not contain primitives. An image processing system can then use the known boundaries of these smaller volumes to determine if a ray may intersect primitives contained within the smaller volumes. If a ray does intersect a volume containing primitives, then a ray intersection test can be run using the trajectory of the ray against the known location and dimensions of the primitives contained within that volume. If a ray does not intersect a particular volume then there is no need to run ray-primitive intersection tests against the primitives contained within that volume. Furthermore, if a ray intersects a bounding volume which does not contain primitives then there is no need to run ray-primitive intersections tests against that bounding volume. Thus, by reducing the number of ray-primitive intersection tests which may be necessary, the use of a spatial index greatly increases the performance of a ray tracing image processing system. Some examples of different spatial index acceleration data structures are octrees, k dimensional Trees (kd-Trees), and binary space partitioning trees (BSP trees). While several different spatial index structures exist, for ease of describing embodiments of the present invention, a kd-Tree will be used in the examples to follow. However, those skilled in the art will readily recognize that embodiments of the invention may be applied to any of the different types of spatial indexes.

A kd-Tree uses axis aligned bounding volumes to partition the entire scene or space into smaller volumes. That is, the kd-Tree may divide a three-dimensional space encompassed by a scene through the use of splitting planes which are parallel to known axes. The splitting planes partition a larger space into smaller bounding volumes. Together the smaller bounding volumes make up the entire space in the scene. The determination to partition (divide) a larger bounding volume into two smaller bounding volumes may be made by the image processing system through the use of a kd-tree construction algorithm.

One criterion for determining when to partition a bounding volume into smaller volumes may be the number of primitives contained within the bounding volume. That is, as long as a bounding volume contains more primitives than a predetermined threshold, the tree construction algorithm may continue to divide volumes by drawing more splitting planes. Another criterion for determining when to partition a bounding volume into smaller volumes may be the amount of space contained within the bounding volume. Furthermore, a decision to continue partitioning the bounding volume may also be based on how many primitives may be intersected by the plane which creates the bounding volume.

The partitioning of the scene may be represented by a binary tree structure made up of nodes, branches and leaves. Each internal node within the tree may represent a relatively large bounding volume, while the node may contain branches to sub-nodes which may represent two relatively smaller partitioned volumes resulting after a partitioning of the relatively large bounding volume by a splitting plane. In an axis-aligned kd-Tree, each internal node may contain only two branches to other nodes. The internal node may contain branches (i.e., pointers) to one or two leaf nodes. A leaf node is a node which is not further sub-divided into smaller volumes and contains pointers to primitives. An internal node may also contain branches to other internal nodes which are further sub-divided. An internal node may also contain the information needed to determine along what axis the splitting plane was drawn and where along the axis the splitting plane was drawn.

Exemplary Bounding Volumes

Figure 5A:
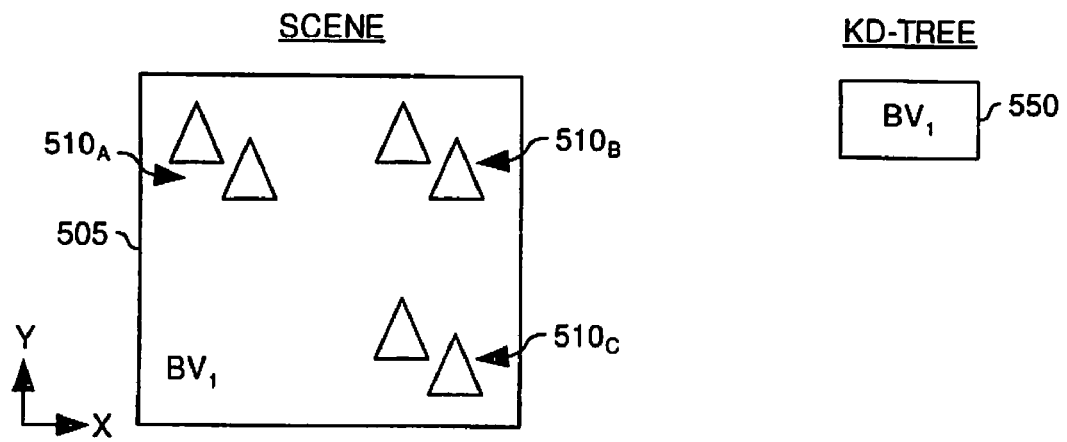
Figure 5B:
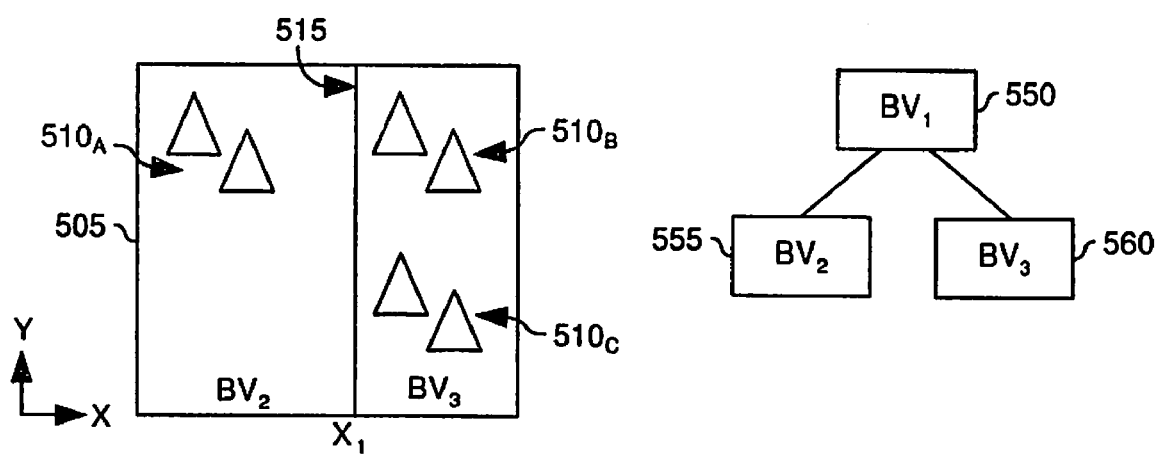

FIGS. 5A-5C illustrate a two-dimensional space to be rendered by an image processing system and a corresponding kd-tree. For simplicity, a two-dimensional scene is used to illustrate the building of a kd-Tree, however kd-Trees may also be used to represent three-dimensional scenes. In the two-dimensional illustration of FIGS. 5A-5C splitting lines are illustrated instead of splitting planes, and bounding areas are illustrated instead of bounding volumes as would be used in a three-dimensional structure. However, one skilled in the art will quickly recognize that the concepts may easily be applied to a three-dimensional scene containing objects.

FIG. 5A illustrates a two-dimensional scene 505 containing primitives 510 to be rendered in the final picture to be displayed on a monitor 510. The largest volume which represents the entire volume of the scene is encompassed by bounding volume 1 ($BV_1$). In the corresponding kd-Tree this may be represented by the top level node 550, also known as the root or world node. In one embodiment of an image processing system, an image processing system may continue to partition bounding volumes into smaller bounding volumes when the bounding volume contains, for example, more than two primitives. As noted earlier the decision to continue partitioning a bounding volume into smaller bounding volumes may be based on many factors, however for ease of explanation in this example the decision to continue partitioning a bounding volume is based only on the number of primitives. As can be seen in FIG. 5A, $BV_1$ contains six primitives, therefore kd-Tree construction algorithm may partition $BV_1$ into smaller bounding volumes.

FIG. 5B illustrates the same two-dimensional scene 505 as illustrated in FIG. 5A. However, in FIG. 5B the tree construction algorithm has partitioned $BV_1$ into two smaller bounding volumes $BV_2$ and $BV_3$. The partitioning of $BV_1$, was accomplished, by drawing a splitting plane $SP_1$ 515 along the x-axis at point $x_1$. This partitioning of $BV_1$ is also reflected in the kd-Tree as the two nodes 555 and 560, corresponding to $BV_2$ and $BV_3$ respectively, under the internal or parent node $BV_1$ 550. The internal node representing $BV_1$ may now store information such as, but not limited to, pointers to the two nodes beneath $BV_1$ (e.g., $BV_2$ and $BV_3$), along which axis the splitting plane was drawn (e.g., x-axis), and where along the axis the splitting plane was drawn (e.g., at point $x_1$).

The kd-Tree construction algorithm may continue to partition bounding volume $BV_3$ because it contains more than the predetermined threshold of primitives (e.g., more than two primitives). However, the kd-Tree construction algorithm may not continue to partition bounding volume $BV_2$, because bounding volume $BV_2$ contains less than or equal to the number of primitives (e.g., only two primitives $510_A$). Nodes which are not partitioned or sub-divided any further, such as $BV_2$, are referred to as leaf nodes.

FIG. 5C illustrates the same two-dimensional scene 505 as illustrated in FIG. 5B. However, in FIG. 5C the kd-Tree construction algorithm has partitioned $BV_3$ into two smaller bounding volumes $BV_4$ and $BV_5$. The kd-construction algorithm has partitioned $BV_3$ using a partitioning plane along the y-axis at point $y_1$. Since $BV_3$ has been partitioned into two sub-nodes it may now be referred to as an internal node. The partitioning of $BV_3$ is also reflected in the kd-Tree as the two leaf nodes 565 and 570, corresponding to $BV_4$ and $BV_5$ respectively. $BV_4$ and $BV_5$ are leaf nodes because the volumes they represent are not further divided into smaller bounding volumes. The two leaf nodes, $BV_4$ and $BV_5$, are located under the internal node $BV_3$ which represents the bounding volume which was partitioned in the kd-Tree.

The internal node representing $BV_3$ may store information such as, but not limited to, pointers to the two leaf nodes (i.e., $BV_4$ and $BV_5$), along which axis the splitting plane was drawn (i.e., y-axis), and where along the axis the splitting plane was drawn (i.e., at point $y_1$).

The kd-Tree construction algorithm may now stop partitioning the bounding volumes because all bounding volumes located within the scene contain less than or equal to the maximum predetermined number of primitives which may be enclosed within a bounding volume. The leaf nodes may contain pointers to the primitives which are enclosed within the bounding volumes each leaf represents. For example, leaf node $BV_2$ may contain pointers to primitives $510_A$, leaf node $BV_4$ may contain pointers to primitives $510_B$ and leaf node $BV_5$ may contain pointers to primitives $510_C$.

The resulting kd-Tree structure, or other spatial index structure, may be stored in the shared memory cache 110. The kd-Tree and the size of corresponding data which comprises the kd-Tree may be optimized for storage in the shared memory cache 110.

A ray tracing image processing system may use the workload manager 205 to traverse the spatial index (kd-Tree). Traversing the kd-Tree may include selecting a branch to a node on a lower level (sub-node) of the kd-Tree to take or proceed to in order to determine if a ray issued by the image processing system intersects any primitives contained within the sub-node. A workload manager 205 may use the coordinates and trajectory of an issued ray to traverse or navigate through the kd-Tree. By executing ray-bounding volume intersection tests, the workload manager 205 may determine if the ray intersects a plane of the bounding volumes represented by nodes within the kd-Tree structure. If the ray intersects a bounding volume which contains only primitives (i.e., a leaf node), the workload manager 205 may send the ray and associated information (e.g., information defining the intersected leaf node) to a vector throughput engine 210 for ray-primitive intersection tests. The workload manager 205 may send the ray and associated information using the inboxes as described above. A ray-primitive intersection test may be executed by the vector throughput engine 210 to determine if the ray intersects the primitives within the bounding volume. This methodology results in fewer ray-primitive intersection tests needed to determine if a ray intersects an object within the scene, in comparison to running ray-primitive intersection tests for a ray against each primitive contained within the scene.

Furthermore, the vector throughput engine 205 may update the color of a pixel through which the issued ray passed and issue secondary rays in response to an intersection of the issued ray and a primitive. The secondary rays may be sent to a workload manager 205, and the workload manager 205 may traverse the secondary rays through the spatial index and the vector throughput engine 210 may perform ray-primitive intersection tests in a similar fashion as done with the original ray issued by the image processing system. The image processing system may continue to issue rays into the three-dimensional scene until each pixel in the frame has a color and the frame can be rendered by the image processing system.

Generating Efficient Spatial Indexes for Predictably Dynamic Objects

A three-dimensional scene to be rendered by an image processing system may contain many objects. As described above, an image processing system may partition the three-dimensional scene such that the objects are placed into bounding volumes. The partitioning information may be stored within nodes of a spatial index such as a kd-tree. The spatial index may then be used by the image processing system when performing ray tracing to render a two-dimensional image (frame).

The image processing system may often be used in conjunction with other applications to provide animation. For example, after the image processing system has rendered a frame, a physics engine in a game system may modify the position of objects or primitives within the three-dimensional scene. According to one embodiment of the invention, the threads of one BTE 105 of the multiple core processing element 100 may be assigned to a physics engine.

In some cases, objects within the three-dimensional scene may be moved by the physics engine in a predictable manner. For example, an object may be in a first position for a first frame, and moved to a second position for a subsequent frame. Then, for a later frame, the object may be moved back to the first position. This object, therefore, follows a predictable path (first position-second position-first position) and may be known as a predictably dynamic object.

In response to moved objects and/or predictably dynamic objects, the image processing system may generate a new spatial index based on the new positions of the moved objects. The image processing system may use the new spatial index when performing ray tracing to render a subsequent frame reflecting the new positions of the objects.

Generating a new spatial index in response to movement of dynamic objects may take a relatively long amount of time. Furthermore, between frames the image processing system may have to generate a new spatial index and perform ray tracing using the spatial index. Therefore, increases in the amount of time required to generate the new spatial index may increase the overall time required to perform ray tracing.

However, according to one embodiment of the invention, in contrast to generating an entirely new spatial index in response to movements of predictably dynamic objects, the image processing system may modify only a portion of the spatial index which defines bounding volumes containing the predictably dynamic object. The portion of the spatial index may define a bounding volume such that it contains the predictably dynamic object in a first position, and the coordinates of the splitting planes which define the bounding volume may be modified such that the bounding volume contains the predictably dynamic object in its new position. By modifying only a portion of the spatial index, the amount of time required to generate a spatial index which reflects the new position of predictably dynamic objects within the three-dimensional scene may be reduced. Consequently, the amount of time which may be necessary to perform ray tracing may be reduced.

Exemplary Three-Dimensional Scene Containing a Predictably Dynamic Object

Figure 6:
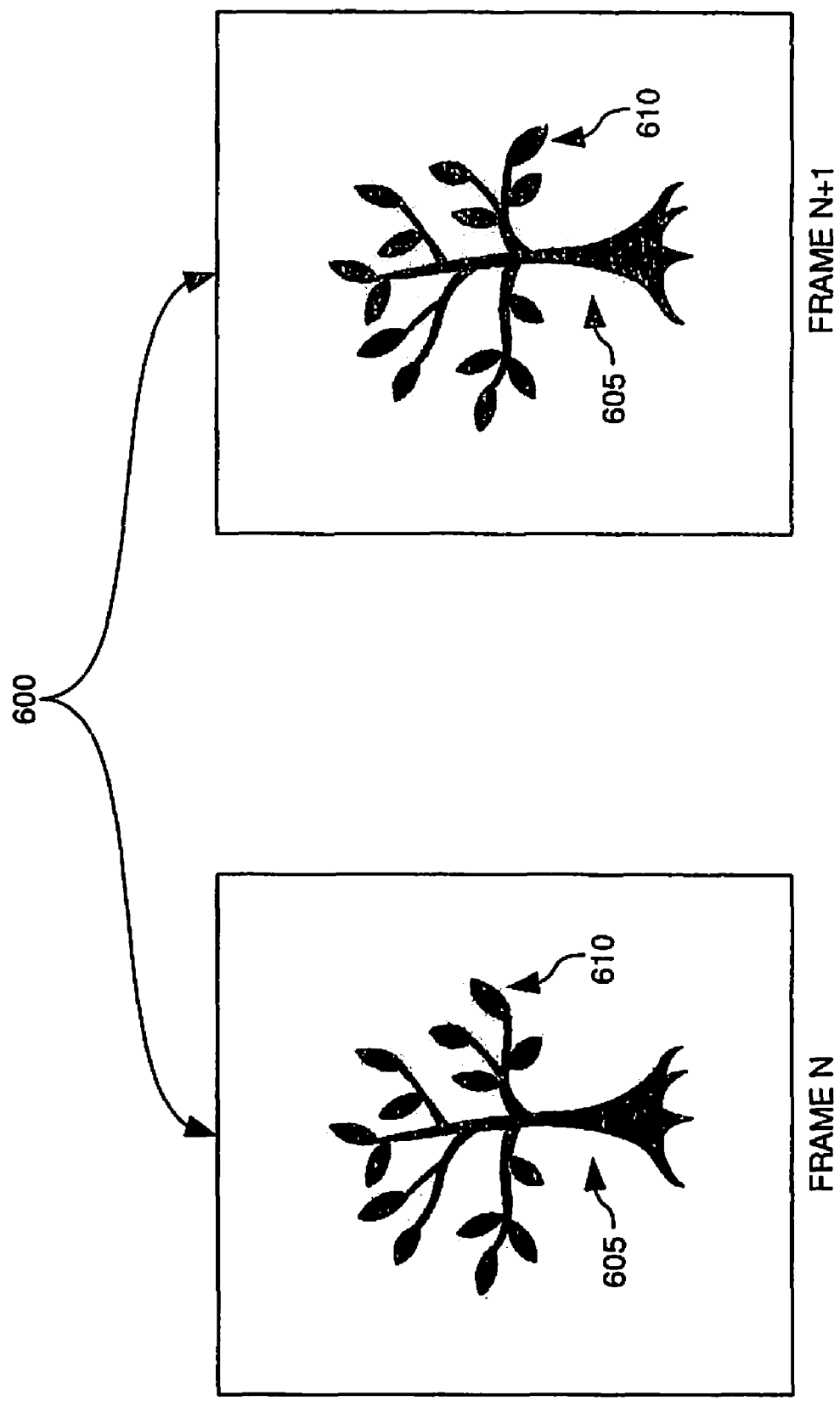
FIG. 6 illustrates exemplary three-dimensional scenes to be rendered by an image processing system, according to one embodiment of the invention.

FIG. 6 illustrates an exemplary three-dimensional scene 600 containing predictably dynamic objects which may be rendered by a ray tracing image processing system. The three-dimensional scene 600 in FIG. 6 contains a tree 605, and the tree 605 is illustrated as having a plurality of leaves. A game system may change the position of the leaves in a predictable manner to simulate wind. For example, FIG. 6 illustrates a predictably dynamic leaf object 610 in a first position in a first frame (Frame N). The first position may have been determined by the game system. Furthermore, FIG. 6 also illustrates the predictably dynamic leaf object 610 in a second position in a second frame (frame N+1). The physics engine may have moved the predictably dynamic leaf object 610 to the second position. Over time (e.g., from frame-to-frame) the physics engine may move the predictably dynamic leaf object 610 between the two positions to simulate movement of the predictably dynamic leaf object 610 due to wind. Therefore, the movement of the predictably dynamic leaf object 610, between the two positions, may be predictable.

As described above, in order to perform ray tracing, the image processing system may create a spatial index by drawing splitting planes which partition the three-dimensional scene into bounding volumes. For example, FIG. 7 illustrates a partitioning of the three-dimensional scene 600 for Frame N. For purposes of clarity, FIG. 7 only illustrates the leaf object 610 in the three-dimensional scene 600. However, it should be understood by those skilled in the art that when partitioning the three-dimensional scene 600 the image processing system may take into consideration all of the objects within the three-dimensional scene 600 (e.g., the tree 605 and other leaves).

FIG. 7 illustrates multiple splitting planes within the three-dimensional scene, wherein each splitting plane is drawn perpendicular to a reference axis (e.g., the x-axis 702 or the y-axis 704). Furthermore, FIG. 7 illustrates a spatial index 750 having nodes corresponding to the splitting planes drawn within the three-dimensional scene 600.

According to one embodiment of the invention, a portion of the spatial index 750 may define the bounding volume(s) which contains a predictably dynamic object within the three-dimensional scene 600. For example, as illustrated by the nodes and branches having a darkened outline in the spatial index 750 of FIG. 7, a portion of the spatial index 750 may define the bounding volumes which contain the predictably dynamic leaf object 610 in the three-dimensional scene 600.

According to one embodiment of the invention, a portion of the spatial index corresponding to a bounding volume which contains/encompasses the predictably dynamic object may be modified in response to the movement of the predictably dynamic object such that the bounding volume contains the predictably dynamic object in its new position. Therefore, only modification of the portion of the spatial index containing the predictably dynamic object may be necessary to reflect the movements of the predictably dynamic object. According to one embodiment of the invention, modification of the portion of the spatial index may include modification of the position of splitting planes along the axis (or axes) which the object moves to move the bounding volume such that it contains the predictably dynamic object in its new position.

The image processing system may create the bounding volumes which contain the predictably dynamic object (e.g., the leaf object 610) using a plurality of splitting planes. For example, with regards to the predictably dynamic leaf object 610 the image processing system may use a first splitting plane 705 drawn at a point $y_1$ along the y-axis, a second splitting plane 710 drawn at a point $y_2$ along the y-axis, a third splitting plane 715 drawn at a point $x_1$ along the x-axis, and a fourth splitting plane 720 drawn at a point $x_2$ along the x-axis. Together these splitting planes may create bounding volumes which contain the predictably dynamic leaf object 610 for the current frame (e.g., Frame N). Information defining each splitting plane may be stored within a corresponding node in the spatial index 750.

For example a first internal node 755 may contain information which defines the first splitting plane 705, a second internal node 765 may contain information which defines the second splitting plane 710, a third internal node 770 may contain information which defines the third splitting plane 715, and a fourth internal node 780 may contain information which defines the fourth splitting plane 720. Furthermore, the image processing system may create leaf nodes which correspond to bounding volumes created by the splitting planes (e.g., leaf node 760, leaf node 775, leaf node 785 and leaf node 790). The leaf node which corresponds to the smallest bounding volume containing the predictably dynamic leaf object may contain a pointer to information defining the predictably dynamic object.

Each internal node of the spatial index may store information which defines a single splitting plane. For example, FIG. 8 illustrates the information stored in four internal nodes (i.e., internal nodes 755, 765, 770 and 780) of the spatial index 750. As illustrated, each internal node may store information which defines the node type (e.g., internal or leaf), along which axis is the splitting plane drawn (e.g., x-axis, y-axis, or z-axis), the position of the splitting plane along the axis, and pointers to child nodes corresponding to the bounding volumes created by the splitting plane.

The first block of data illustrated in FIG. 8 corresponds to information stored within the internal node 755 of the spatial index 750. The node 755 contains information indicating the splitting plane as being drawn along the y-axis and drawn at a position $y_1$ along the y-axis. Thus, node 755 identifies the splitting plane 705 illustrated in FIG. 7. Lastly, the node 755 contains pointers to the child nodes (i.e., 760 and 765) corresponding to bounding volumes created by the splitting plane 705 along the y-axis at point $y_1$.

The second block of data illustrated corresponds to information stored within the internal node 765 of the spatial index 750. The node 765 contains information identifying itself as an internal node. Furthermore, the node 765 contains information indicating that its splitting plane is along the y-axis at a point $y_2$. Thus, node 765 corresponds to the splitting plane 710 illustrated in FIG. 7. Lastly, the node 765 contains pointers to the child nodes (i.e., 770 and 775) corresponding to bounding volumes created by the splitting plane 710 along the y-axis at point $y_2$.

The third block of data illustrated corresponds to information stored within the internal node 770 of the spatial index 750. The node 770 contains information identifying itself as an internal node. Furthermore, the node 770 contains information indicating that its splitting plane is along the x-axis at a point $x_1$. Thus, node 770 corresponds to the splitting plane 715 illustrated in FIG. 7. Lastly, the node 770 contains pointers to the two child nodes (i.e., 780 and 785) corresponding to bounding volumes created by the splitting plane 715 along the x-axis at point $x_1$.

The fourth block of data illustrated corresponds to information stored within the internal node 780 of the spatial index 750. The node 780 contains information identifying itself as an internal node. Furthermore, the node 780 contains information indicating that its splitting plane is along the x-axis at a point $x_2$. Thus, node 780 corresponds to the splitting plane 720 illustrated in FIG. 7. Furthermore, the node 780 contains pointers to two child nodes (i.e., 790 and 795) corresponding to bounding volumes created by the splitting plane 720 illustrated in FIG. 7.

As mentioned above, according to one embodiment of the invention, instead of rebuilding the entire spatial index in response to a movement of a predictably dynamic object, the image processing system may modify only the portion of the spatial index (e.g., kd-tree) which contains the predictably dynamic object. According to one embodiment of the invention, the image processing system may modify the portion of the spatial index by modifying the information identifying the position of splitting planes within the three-dimensional scene.

Figure 9:
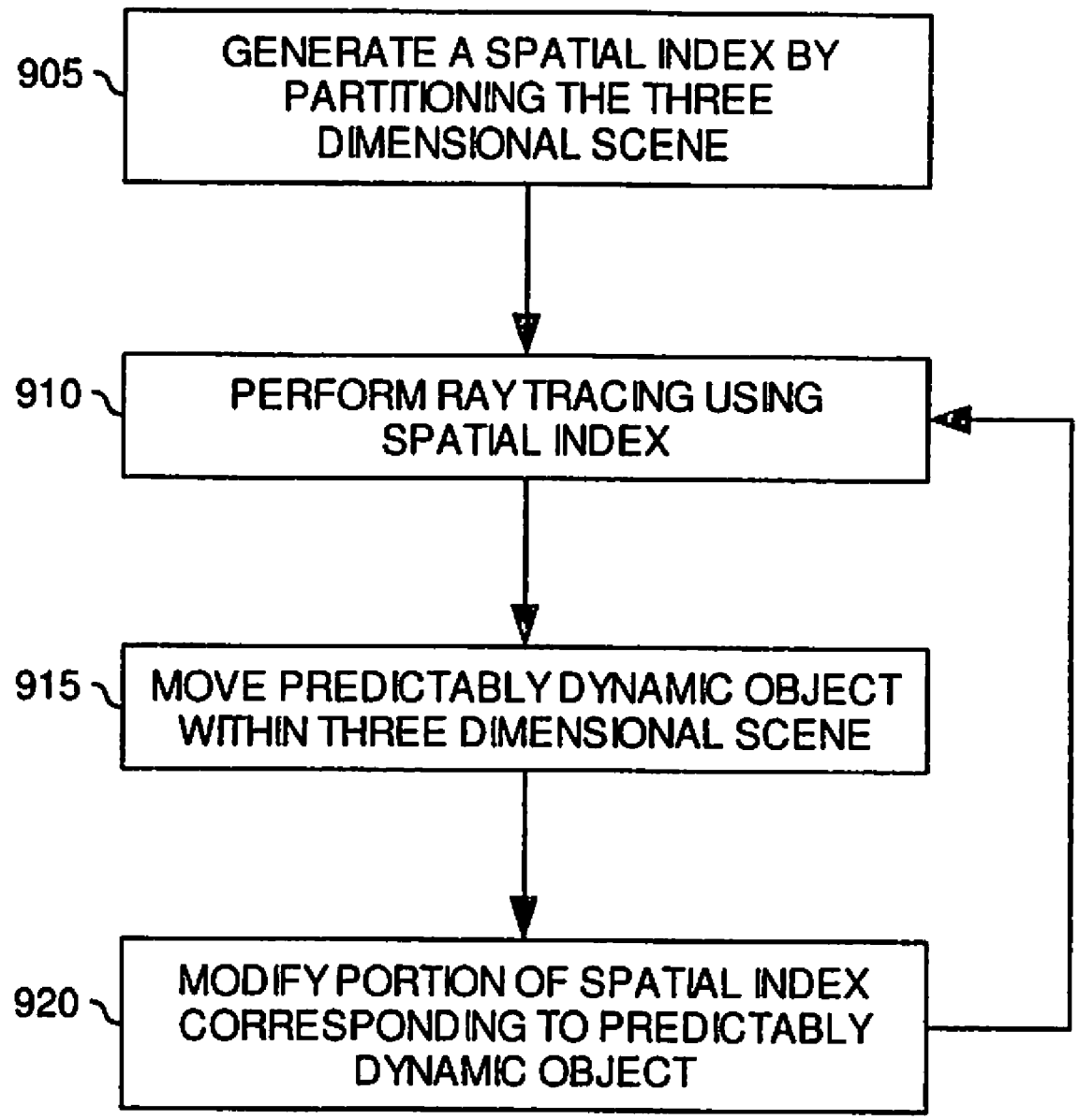
FIG. 9 is a flowchart illustrating an exemplary method of generating a modifying a spatial index, according to one embodiment of the invention.

Exemplary Method of Modifying a Spatial Index in Response to Movements of a Predictably Dynamic Object FIG. 9 is a flowchart which illustrates an exemplary method 900 of generating a spatial index and modifying a portion of the spatial index in response to a movement of a predictably dynamic object, according to one embodiment of the invention. The method 900 begins at step 905 where an image processing system may generate a spatial index by partitioning a three-dimensional scene. For example, the image processing system may generate the spatial index 750 by partitioning the three-dimensional scene 600 and corresponding to Frame N. In the process of generating the spatial index, the image processing system may generate a portion of the spatial index which corresponds to a predictably dynamic object within the three-dimensional scene. The portion of the spatial index corresponding to the predictably dynamic object may reflect a first position of the predictably dynamic object.

Next, at step 910 the image processing system may perform ray tracing using the generated spatial index. By performing ray tracing using the spatial index, the image processing system may render an image. The rendered image may reflect the first position of the predictably dynamic object.

After performing ray tracing, at step 915, the predictably dynamic object may be moved to a new position within the three-dimensional scene. For example, as illustrated in FIG. 6, the predictably dynamic leaf object 610 may be moved from a first position in Frame N to a second position in Frame N+1. The predictably dynamic object may be moved, for example, by a physics engine in a game system.

Next, at step 920, the image processing system may modify the portion of the spatial index corresponding to the predictably dynamic object. According to one embodiment of the invention, the image processing system may modify the portion of the spatial index corresponding to the predictably dynamic object by moving the splitting planes defining bounding volumes to new locations such that the bounding volumes created by the splitting planes contain the predictably dynamic object in its new position.

For example, FIG. 10 illustrates the three-dimensional scene 600 for Frame N+1. The three-dimensional scene 600 illustrates the new/second position of the predictably dynamic leaf object 610. Furthermore, FIG. 6 illustrates new positions for the splitting planes which encompass the predictably dynamic leaf object 610 in its second position. Specifically, the first splitting plane 705 is now located at point $y_3$ along the y-axis, and the second splitting plane 710 is now located at point $y_4$ along the y-axis. Thus, the first splitting plane 705 and the second splitting plane 710 were moved a distance $\Delta y$ ($\Delta y = |y_1 - y_3| = |y_2 - y_4|$) along the y-axis, such that the bounding volumes created by the splitting planes contain the predictably dynamic leaf object 610 in its second position.

As illustrated in FIG. 6, neither the dimensions of the bounding volumes nor the axis along which each splitting plane is drawn are modified in order to contain the predictably dynamic leaf object 610. Rather, in order to contain the predictably dynamic leaf object 610 in its new position only the positions of the two splitting planes along the y-axis are changed. Consequently, as illustrated in FIG. 10, the structure of the portion of the spatial index 750 corresponding to the predictably dynamic leaf object 610 does not change.

However, as illustrated in FIG. 11, modification of the spatial index may include modifying the position of the first splitting plane 705 and the second splitting plane 710 in the respective nodes of the spatial index which correspond to the splitting planes. Thus, as illustrated by the darkened outlines indicating modified data within the nodes, the information stored in the first node 755 may be modified to indicate the movement of the first splitting plane 705 to the new position $y_3$ along the y-axis. Similarly, the information stored in the second node 765 may be modified to indicate the movement of the second splitting plane 710 to the new position $y_4$ along the y-axis. Consequently, according to one embodiment of the invention, movement of a predictably dynamic object may be reflected in a spatial index by modifying the information identifying the position of splitting planes which create bounding volumes containing the predictably dynamic object within the three-dimensional scene.

After the modifying the portion of the spatial index which contains the predictably dynamic object, the image processing system may return to step 910 to perform ray tracing using the modified spatial index.

Although the preceding example of modifying a portion of the spatial index has been explained above with reference to modifying only splitting planes along the y-axis, embodiments of the invention may be applied along any axis. Similarly, modifications to the spatial index to reflect movements of a predictably dynamic spatial index may be made to multiple splitting planes along multiple axes. Thus, a spatial index may be modified to reflect movements of predictably dynamic objects in any direction within the three-dimensional scene. Furthermore, embodiments of the invention may be applied to multiple predictably dynamic objects within the three-dimensional scene. Therefore, multiple portions of the spatial index may be modified simultaneously to reflect movements of multiple predictably dynamic objects within the three-dimensional scene.

Furthermore, although embodiments of the invention were described herein with respect to a spatial index built on axis aligned bounding volumes (kd-tree) axis aligned spatial index, embodiments of the invention may apply to other types of spatial index tree structures.

CONCLUSION

In contrast to generating a new spatial index in response to movements of a predictably dynamic spatial index, an image processing system may modify only a portion of a previously generated spatial index. According to one embodiment of the invention, the image processing system may modify the previous spatial index by changing the position of splitting planes along splitting axes. Modifying only a portion of a spatial index may take relatively less time than generating a new spatial index. Therefore, by modifying only a portion of a spatial index in response to movements of a predictably dynamic object within a three-dimensional scene, an image processing system may reduce the time necessary to perform image processing.

While the foregoing is directed to embodiments of the present invention, other and further embodiments of the invention may be devised without departing from the basic scope thereof, and the scope thereof is determined by the claims that follow.

What is claimed is:

1. A method of representing objects located within a three-dimensionl scene in spatial indexes, the method comprising:
providing an object in a first position within the three-dimensional scene, wherein the object moves in a predictable manner;
generating, by operation of one or more computer processors, a spatial index having nodes defining bounded volumes which partition the three-dimensional scene, wherein at least one of the nodes of the spatial index defines bounding volumes containing the object in the first position, wherein the spatial index is selected from a k-dimentional tree (kd-tree), a binary space partitioning (BSP)tree, and an octree, wherein at least one node of the kd-tree defines a single splitting plane for splitting a bounding volume in the three-dimensional scene; and
in response to movement of the object from the first position to a second position, modifying the at least one of the nodes of the spatial index such that the bounding volumes defined by the at least one of the nodes of the spatial index contain the object in the second position and such that the spatial index is not entirely rebuilt, comprising:
modifying, in the spatial index and based on the second position of the object, at least one of: (i) the information which indicates an axis along which the splitting plane is drawn and (ii) the information which indicates the position of the splitting plane along the axis.

2. The method of claim 1, wherein the at least one of the nodes of the spatial index contains information which indicates the axis along which the splitting plane is drawn, and information which indicates the position of the splitting plane along the axis, wherein the splitting plane creates a bounding volume containing the object.

3. The method of claim 1, wherein the object moves along a predictable path including the first position and the second position.

4. The method of claim 1, further comprising:
moving the object from the second position back to the first position; and
modifying the at least one of the nodes of the spatial index such that the bounding volumes defined by the at least one of the nodes of the spatial index contain the object in the first position.

5. The method of claim 1, wherein the at least one of the nodes of the spatial index further comprises at least one leaf node containing a pointer to information defining the object.

6. The method of claim 1, wherein the at least one of the nodes of the spatial index represents less than the entire spatial index.

7. A non-transitory computer readable medium containing a program which, when executed, performs operation comprising:
providing an object in a first position within the three-dimensional scene, wherein the object moves in a predictable manner;
generating a spatial index having nodes defining bounded volumes which partition the three-dimensional scene, wherein at least one of the nodes of the spatial index defines bounding volumes containing the object in the first position, wherein the spatial index is selected from a k-dimensional tree (kd-tree), a binary space partitioning (BSP) tree, and an octree, wherein at least one node of the kd-tree defines a single splitting plane for splitting a bounding volume in the three-dimensional scene; and
in response to movement of the object from the first position to a second position, modifying the at least one of the nodes of the spatial index such that the bounding volumes defined by the at least one of the nodes of the spatial index contain the object in the second position and such that the spatial index is not entirely rebuilt, comprising:
modifying, in the spatial index and based on the second position of the object, at least one of: (i) the information which indicates an axis along which the splitting plane is drawn and (ii) the information which indicates the position of the Splitting plane along the axis.

8. The non-transitory computer readable medium of claim 7, wherein the at least one of the nodes of the spatial index contains information which indicates the axis along which the splitting plane is drawn, and information which indicates the position of the splitting plane along the axis, wherein the splitting plane creates a bounding volume containing the object.

9. The non-transitory computer readable medium of claim 7, wherein the object repetitively moves along a predictable path incititing at least the first position and the second position.

10. The non-transitory computer readable medium of claim 7, wherein the operations further comprise:
moving the object from the second position back to the first position; and
modifying the at least one of the nodes of the spatial index such that the bounding volumes defined by the at least one of the nodes of the spatial index contain the object in the first position.

11. The non-transitory computer readable medium or claim 7, wherein the at least one of the nodes of the spatial index represents less than the entire spatial index.

12. An image processing system, comprising:

spatial index logic configured to generate a spatial index having nodes defining bounded volumes which partition a three-dimensional scene, wherein at least one of the nodes of the spatial index defines bounding volumes containing an object in a first position within the three-dimensional scene, wherein the object moves in a predictable manner, wherein the spatial index is selected from a k-dimensional tree (kd-tree), a binary space partitioning (BSP) tree, and an octree, wherein at least one node of the kd-tree defines a single splitting plane for splitting a bounding volume in the three-dimensional scene; and a processing element configured to move the object from the first position to a second position; and wherein the spatial index logic is further configured to modify the at least one of the nodes of the spatial index such that the bounding volumes defined by the at least one of the nodes of the spatial index contain the object in the second position and such that the spatial index is not entirely rebuilt, wherein modifying the at least one of the nodes of the spatial index comprises modifying, in the spatial index and based on the second position of the object, at least one of: (i) the information which indicates an axis along which the splitting plane is drawn and (ii) the information which indicates the position of the splitting plane along the axis.

13. The image processing system of claim 12, wherein the at least one of the nodes of the spatial index contains information which indicates the axis along which the splitting plane is drawn, and information which indicates the position of the splitting plane along the axis, wherein the splitting plane creates a bounding volume containing the object.

14. The image processing system of claim 12, wherein the object moves along a predictable path including the first position and the second position.

15. The image processing system of claim 12, wherein the physics engine is further configured to move the object from the second position back to the first position; and wherein the spatial index logic is further configured to modify the at least one of the nodes of the spatial index such that the bounding volumes defined by the at least one of the nodes of the spatial index contain the object in the first position.

16. The image processing system of claim 12, wherein the at least one of the nodes of the spatial index represents less than the entire spatial index.

17. The image processing system of claim 12, wherein the at least one of the nodes of the spatial index further comprises at least one leaf node containing a pointer to information defining the object.

18. The method of claim 1, further comprising:

moving the object from the second position back to the first position; and modifying the at least one node of the kd-tree such that the bounding volumes defined by the at least one of the nodes of the kd-tree contain the object in the first position, comprising:

modifying, in the spatial index and based on the first position of the object, at least one of: (i) the information which indicates the axis along which the splitting plane is drawn and (ii) the information which indicates the position of the splitting plane along axis.

19. The method of claim 1, wherein the at least one node of the kd-tree comprises an internal node containing: (i) information which indicates an axis along which the splitting plane is drawn; (ii) information which indicates a position of the splitting plane along the axis; and (iii) a pointer to a child node, wherein the child node is selected from a second internal node and a leaf node, wherein the leaf node represents a bounding volume that is not further subdivided by any splitting plane defined by the kd-tree, and wherein the leaf node comprises a pointer to the object in the three-dimensional scene.

* * * * *